United States Patent
Yacoub et al.

(10) Patent No.: US 7,013,005 B2
(45) Date of Patent: Mar. 14, 2006

(54) SYSTEM AND METHOD FOR PRIORITIZING CONTACTS

(75) Inventors: Sherif Yacoub, Sant Cugat del Valles (ES); Xiaofan Lin, San Jose, CA (US); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 10/776,569

(22) Filed: Feb. 11, 2004

(65) Prior Publication Data

US 2005/0175167 A1 Aug. 11, 2005

(51) Int. Cl.
*H04M 3/00* (2006.01)
*H04M 5/00* (2006.01)

(52) U.S. Cl. .............................. 379/265.13; 379/266.02
(58) Field of Classification Search .. 379/88.01–88.04, 379/265.02, 265.06, 265.09, 265.12, 266.02; 704/10, 231, 246
See application file for complete search history.

(56) References Cited

U.S. PATENT DOCUMENTS

| | | | |
|---|---|---|---|
| 6,215,859 B1 | 4/2001 | Hanson | |
| 6,335,962 B1 | 1/2002 | Ali et al. | |
| 6,353,810 B1 | 3/2002 | Petrushin | |
| 6,408,277 B1 * | 6/2002 | Nelken | 705/9 |
| 6,622,140 B1 * | 9/2003 | Kantrowitz | 707/5 |
| 6,901,390 B1 * | 5/2005 | Mizokawa | 706/14 |
| 2002/0194002 A1 | 12/2002 | Petrushin | |
| 2003/0023688 A1 | 1/2003 | Denenberg et al. | |
| 2003/0033145 A1 * | 2/2003 | Petrushin | 704/236 |
| 2003/0055654 A1 | 3/2003 | Oudeyer | |
| 2003/0069936 A1 * | 4/2003 | Warner et al. | 709/206 |
| 2004/0101127 A1 * | 5/2004 | Dezonno et al. | 379/265.02 |

FOREIGN PATENT DOCUMENTS

| | | |
|---|---|---|
| EP | 0946032 | 9/1999 |
| EP | 1102462 | 5/2001 |
| EP | 1256937 | 11/2002 |
| JP | 10-210153 | 8/1998 |
| WO | WO0051179 | 10/2000 |
| WO | WO0145361 | 6/2001 |

OTHER PUBLICATIONS

Yacoub, Sherif—"Two-Engine Speech Recongnition" Pending application filed Jan. 30, 2003—U.S. Appl. No. 10/354,415.

* cited by examiner

*Primary Examiner*—Benny Q. Tieu
(74) *Attorney, Agent, or Firm*—Lloyd E. Dakin, Jr.

(57) ABSTRACT

A system and method for prioritizing contacts is disclosed. The method discloses: receiving a set of requests from a set of contacts to be connected to a recipient; generating a first priority level score for each request based on an acoustical analysis of a contact speech signal within the request; generating a second priority level score for each request based on a keyword analysis of the request; combining the priority level scores for each request into a combined priority level score; prioritizing the requests within the set of requests based on their respective combined priority level scores; and routing to the recipient that request, from the set of requests, having a highest combined priority level score. The system of the present invention includes all means and mediums for implementing the method.

27 Claims, 5 Drawing Sheets

SYSTEM AND METHOD FOR PRIORITIZING CONTACTS

CROSS-REFERENCE TO RELATED OR CO-PENDING APPLICATIONS

This application relates to co-pending U.S. patent application Ser. No. 10/676,995, entitled "System And Method For Operator Assisted Automated Call Handling," filed on Sep. 30, 2003, by Xiaofan Lin; U.S. patent application Ser. No. 10/769,137, entitled "System And Method For Extracting Demographic Information," filed on Jan. 30, 2004, by Yacoub et al.; U.S. patent application Ser. No. 10/769,240, entitled "System And Method For Language Variation Guided Operator Selection," filed on Jan. 30, 2004, by Lin et al.; U.S. patent application Ser. No. 10/339,423, entitled "Commercial Automatic Speech Recognition Engine Combinations," filed on Jan. 9, 2003, by Xiaofan Lin; U.S. patent application Ser. No. 10/715,179, entitled "E-Mail Application With User Voice Interface," filed on Nov. 17, 2003, by Simske et al.; and U.S. patent application Ser. No. 10/338,584 entitled "Methods and Systems for Organizing Electronic Documents," filed on Jan. 7, 2003, by Steven J. Simske. These related applications are commonly assigned to Hewlett-Packard of Palo Alto, Calif.

BACKGROUND OF THE INVENTION 1.1 Field of the Invention

The present invention relates generally to systems and methods for call handling, and more particularly to for prioritizing contacts.

2.1 Discussion of Background Art

Automated call handling systems, such as Interactive Voice Response (IVR) systems, using Automatic Speech Recognition (ASR) and Text-to-speech (TTS) software are increasingly important tools for providing information and services to contacts in a more cost efficient manner. IVR systems are typically hosted by call centers that enable contacts to interact with corporate databases and services over a telephone using a combination of voice utterances and telephone button presses. IVR systems are particularly cost effective when a large number of contacts require data or services that are very similar in nature, such as banking account checking, ticket reservations, etc., and thus can be handled in an automated manner often providing a substantial cost savings due to a need for fewer human operators.

Many call centers enable contacts to leave a message so that an agent, operator or customer representative can get back to the contact after analyzing the message and finding the most suitable solution. These messages are first placed in a queue so that when a next operator becomes available, the operator can select a message to respond to.

The criterion for selecting which message should be responded to first is important for the call center. Some commonly used criteria include: First In-First Out (FIFO) whereby contacts are responded to in the order the call center received their message; geographically influenced selection, which takes into consideration the caller's time zone and operators available in that time zone; permitting the contact to self prioritize their message based on some predefined criteria, such as loss of life, mission critical, major business problem, minor business problem, non critical issue; permitting the operator to select which message to answer next after listening to many if not most of the messages in the queue; and so on.

Each of the above techniques, however, often yields less than optimal selection results. For instance, blind selection techniques like first-in-first-out (FIFO) typically leave some important calls and contacts on-hold for a long time while other less critical calls are responded to first; contact-driven techniques (i.e. self prioritization) often results in a misleading message priority determination since many contacts tend to think that their problem is the most urgent; and operator selection techniques tend to be inefficient and time consuming.

In response to the concerns discussed above, what is needed is a system and method for prioritizing messages that overcomes the problems of the prior art.

SUMMARY OF THE INVENTION

The present invention is a system and method for prioritizing. The method of the present invention includes: receiving a set of requests from a set of contacts to be connected to a recipient; generating a first priority level score for each request based on an acoustical analysis of a contact speech signal within the request; generating a second priority level score for each request based on a keyword analysis of the request; combining the priority level scores for each request into a combined priority level score; prioritizing the requests within the set of requests based on their respective combined priority level scores; and routing to the recipient that request, from the set of requests, having a highest combined priority level score. The system of the present invention includes all means and mediums for implementing the method.

These and other aspects of the invention will be recognized by those skilled in the art upon review of the detailed description, drawings, and claims set forth below.

DETAILED DESCRIPTION OF THE PREFERRED EMBODIMENT

The present invention presents a system and method that prioritizes messages and on-hold contacts waiting for a response from a recipient. Messages are prioritized using a plurality of classifiers both at an acoustic level and a textual and attributive level. Use of multiple classifiers helps improve the system's prioritization accuracy and ensure that important calls are handled first. Such increased prioritization accuracy should also help improve customer satisfaction and a call center's business operations.

In a preferred embodiment discussed below, the recipient is an operator at a call center. However, those skilled in the art will recognize that the prioritization system and method discuss is equally applicable toward any prioritization space, including prioritizing messages within a person's e-mail in-box, prioritizing bills to be paid, and so on.

Messages can be prioritized in any number of ways depending upon how the present invention is applied. For example, messages can be prioritized by their urgency, importance, business relevance, latency, origin, classification, content, emotional content, contact assigned priority, and so on. The messages themselves can be transmitted by any medium such as telephone, cell phone, fax, and e-mail.

Some examples of how contacts and messages can be prioritized include: giving a higher priority to messages from angry or frustrated contacts; giving a lower priority to messages from calm contacts; giving higher priority to contact who are on-hold and muttering to themselves; giving higher priority to angry or sad emotions in a customer care context; and giving higher priority to panic emotions in an emergency-911 applications.

Call center statistics with respect to any particular prioritization approach can be kept an analyzed to help fine tune how contacts and messages are prioritized so as to ensure overall call center performance.

Figure 1:
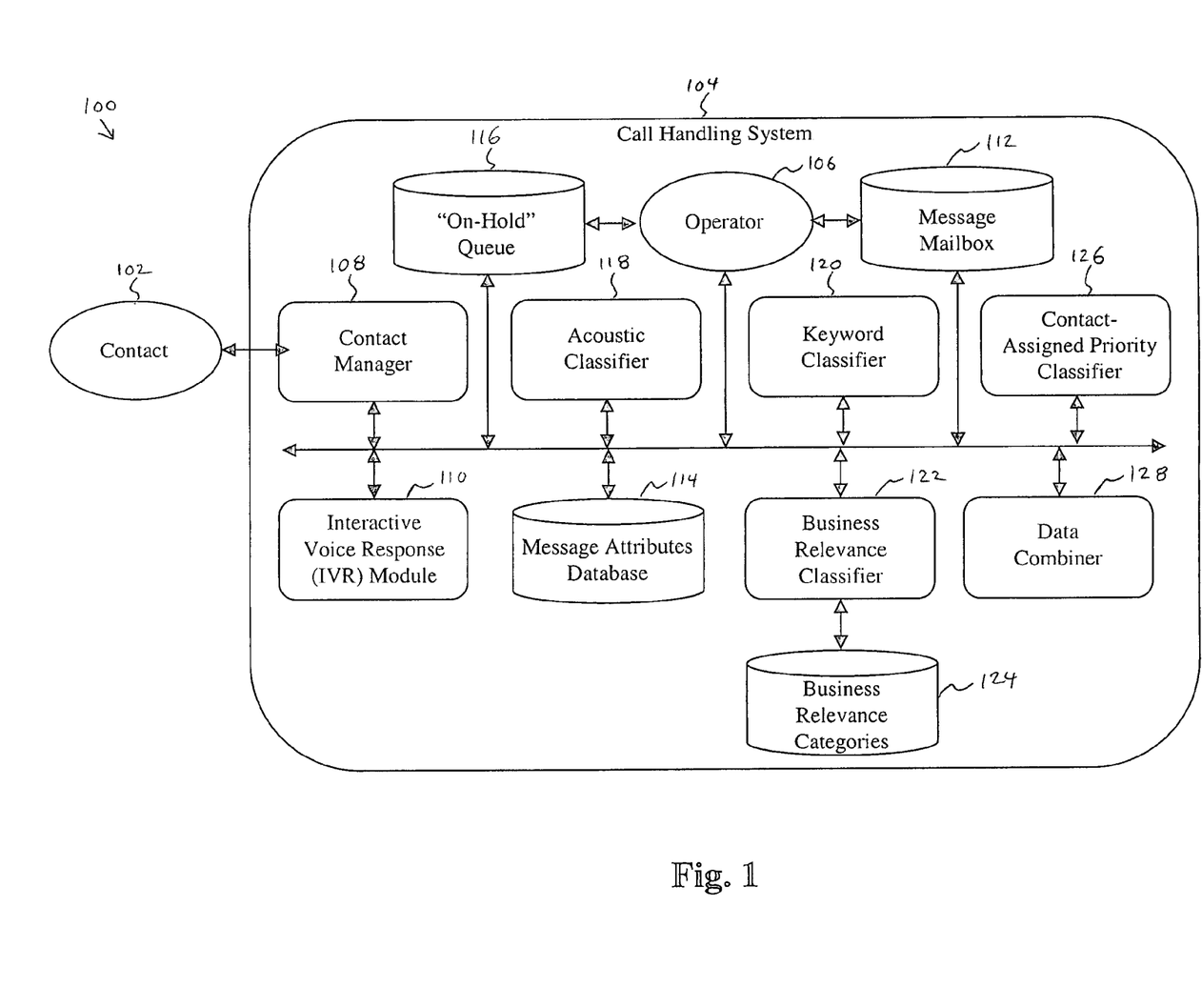
FIG. 1 is a dataflow diagram of one embodiment of a system for prioritizing contacts.

FIG. 1 is a dataflow diagram of one embodiment of a system 100 for prioritizing contacts. The call handling system 104 of the present invention preferably provides some type of voice interactive information management service to a set of contacts. Anticipated information services include those associated with customer response centers, enterprise help desks, business generation and marketing functions, competitive intelligence methods, as well as many others. Contacts may be customers, employees, or any party in need of the call handling system's services. Also while the discussion below is sometimes discussed with respect to only one contact, the invention's functionality is intended to extend to a set of contacts.

To begin, the call handling system 104 receives a request from a contact to be connected to an operator 106. Note, while the present invention is discussed with respect to human operators at a call center, the invention is applicable as well to any system or method that must prioritize a series of tasks, messages, etc. for later execution by either a person or a machine, such as a computer. If the operator is available, a contact manager 108 connects the contact 102 to the operator 106. The contact's 102 "request" is herein defined to be either in the form of a message left by a contact or in the form of a contact waiting on-hold for a next available operator.

If the operator is not available, the contact manager 108 connects the contact 102 to an Interactive Voice Response (IVR) module 110. The IVR module 110 provides an automated interface between the contact's 102 speech signals, received over a voice channel, and the system's 104 overall functionality. To support such an interface with the contact 102, the IVR module 110 may include a Text-To-Speech (TTS) translator, Natural Language Processing (NLP) algorithms, Automated Speech Recognition (ASR), and various other dialog interpretation (e.g. a Voice-XML interpreter) tools.

The IVR module 110 records and stores a first message from the contact 102 in a message mailbox 112. The IVR module associates a priority level attribute with the contact 102 and the first message. The priority level attribute is used to order contacts placed in an on-hold queue 116 and messages left by contacts in the message mailbox 112. The priority level attribute is preferably assigned a confidence score that is continuous in nature, and ranges from p=0.0 to p=1.0, where p=0.0 indicates a lowest possible priority level, and p=1.0 indicating a highest possible priority level. As is discussed below, the operator 106 is expected to respond first to higher priority contacts in the on-hold queue 116 and higher priority messages in the message mailbox 112.

Next, the IVR module 110 asks the contact 102 to select and assign a priority level, to the first message, from a list of priority levels. In one embodiment, the priority levels, and their associated confidence scores, could be: emergency priority (p=1.0), high priority (p=0.8), medium priority (p=0.5), and low priority (p=0.2). The priority levels can also be dynamically adjusted using various learning algorithms such as those discussed below. Those skilled in the art will recognize that other priority levels and associated confidence scores could also be used.

The IVR module associates a second set of attributes with the first message. These attributes preferably include the contact's 102 phone number and calling location, a contact ID, a time and date, and so on. The priority level attribute and the second set of attributes are stored in a message attributes database 114.

If the contact 102 has requested to be put "on-hold", the IVR module 110 routes the contact 102 to the on-hold queue 116. While on-hold, the contact 102 can be streamed music, advertisements, and the like. The IVR module 110 collects and stores a second message from the contact 102 in the message mailbox 112.

Note that the first message from the contact 102 is one in which the contact 102 explicitly requests a service or information from the call handling system 104 and is most useful in providing substantive information to the operator 106. The second message from the contact 102, however, continually records the contact's 102 utterances while the contact 102 is on-hold, and is most useful in providing information on the contact's 102 emotional state while on-hold (e.g. the contact's 102 "mutterings"). The second message in some cases may also provide additional substantive information with respect to the contact's 102 original reason for contacting the call handling system 104.

In the discussion that follows, all of the information from the contact 102, such as the first message, the second message, and the attributes, are used to help generate a combined confidence score for the priority level attribute. Contacts and messages having higher combined confidence scores are preferably presented to and responded to by the operator 106 before those having lower combined confidence scores. Except for the priority level confidence scores assigned directly by the contact 102, the system 104 preferably calculates confidence scores for the priority level attribute using one or more well known techniques, such as those employing Neural Networks, Support Vector Machines, K-NNs, Gaussian Mixture Models (GMMS), decision trees, and other classifiers.

Acoustic Classifier

Next, an acoustic classifier 118 accesses the first and second messages stored in the message mailbox 112. The acoustic classifier 118 generates a set of emotional confidence scores for the first and second messages with respect to a set of predefined emotions base on acoustic features found within the messages. The predefined emotions preferably include: sadness, boredom, happiness, hot anger, cold anger, frustration, panic and calmness. The feature set used by the acoustic classifier 118 to generate these emotional confidence scores may include: pitch contour statistics, contour statistics of the first derivative of the pitch, energy contour statistics, contour statistics of the first derivative of the energy, and audible and inaudible duration features. A confusion matrix also is used to help assign the emotional confidence scores.

Next, the acoustic classifier 118 sets a priority level confidence score for the priority level attribute to a predetermined value based on a predetermined set of the emotional confidence scores. For instance, a highly emotional contact 102 may be associated with a higher priority than a relatively calm contact 102. The acoustic classifier 118 stores the confidence score for the priority level attribute in the message attributes database 114.

Keyword Classifier

The automated speech recognition (ASR) engine within the IVR module 110 converts the first and second messages stored in the message mailbox 112 into a textual file. A keyword classifier 120 searches the textual file for a predetermined set of keywords or key phrases. Some of the predetermined keywords include: "urgently", "as soon as possible", immediately", "ok", "wait till later", "fine", and "no problem" are identified within the textual file. The set of keywords and key phrases are preferably prepared off-line and expanded using natural language processing techniques (e.g. hyponym expansion using WordNet). The keywords are stored in a database or a look-up table. The set of keywords can also be readily adjusted to search for keywords and phrases in many other languages.

The keyword classifier 120 sets a priority level confidence score for the priority level attribute to a predetermined value base on whether the message includes a predefined set and number of the keywords and key phrases. For example, if the messages include the keyword "urgently" or its synonyms at least five times, then the priority level confidence score is preferably set to a high priority level such as $p=0.7$. Whereas, if the messages include the keyword "no problem" or its synonyms several times, then the priority level confidence score is preferably set to a low priority level such as $p=0.1$.

However, since multiple conflicting assignments are possible (e.g. what if the user says "it's not urgent?") various HMMs, Bayesian, and conditional probabilities which consider each of the words in the contact's 102 sentence are used as well. For instance, a summed priority level based on all the keywords found, their context and their relative priorities can be used.

The keyword classifier 120 stores the confidence score in the message attributes database 114.

Business Relevance Classifier

A business relevance classifier 122 searches the textual file, introduced above, for a predetermined set of business relevance keywords related to a predefined set of business relevance categories 124. Depending upon an application of the present invention, these business relevance categories 124 may include: name or division of the company from which the contact 102 is calling; who the contact 102 is at the company (e.g. president, manager, etc.); volume of business done with the contact 102; contacts calling about a unique problem (e.g. a recall); whether the contact has a service contract; historical data associated with the contact 102, such as the contact's 102 prior reasons for contacting the system 104, and so on. Those skilled in the art will know of many other business relevance categories.

The business relevance classifier 122 sets a priority level confidence score for the priority level attribute to a predetermined value based on whether the message includes a predefined set and number of the business relevance keywords. The business relevance keywords are stored in a database or a look-up table. For example, if the messages include the business relevance keyword "president", then the priority level confidence score is preferably set to a high priority level such as $p=0.8$. Whereas, if the messages include the keyword "Company Q" and the system 104 has records indicating that a very low volume of business is done with "Company Q", then the priority level confidence score is preferably set to a low priority level such as $p=0.1$.

Since multiple conflicting assignments are possible (e.g. what if the user says "it's not urgent?") various HMMs, Bayesian, and conditional probabilities which look at all of the words in the contact's 102 sentence are used as well.

The business relevance classifier 122 stores the confidence score for the priority level attribute in the message attributes database 114.

Contact-Assigned Priority Classifier

A contact-assigned priority level classifier 126 identifies the priority level assigned to the first message by the contact 102. As mentioned above, the priority levels preferably include: emergency priority, high priority, medium priority, and low priority.

The contact-assigned priority level classifier 126 sets a contact-assigned priority level confidence score equal to one of a set of predetermined priority level confidence scores, depending upon the priority level assigned by the contact 102. For example, if the contact-assigned priority level is "high priority" then the contact-assigned priority level classifier 126 sets the contact-assigned priority level confidence score to $p=0.8$. Similarly, if the contact-assigned priority level is "low priority" then the contact-assigned priority level classifier 126 sets the contact-assigned priority level confidence score to $p=0.2$.

Next, the priority level classifier 126 stores the confidence score for the priority level attribute in the message attributes database 114.

Other Classifiers

Those skilled in the art will recognize that other priority level classification modules may also be used to generate a priority level attribute confidence score for a contact or message.

Data Combiner

A data combiner 128 retrieves each of the confidence scores stored in the message attributes database 114 by the various classifiers 118, 120, 122, and 126 for the priority level attribute. The combiner 128 dynamically assigns a weight to each of the confidence scores depending upon the classifier from which the confidence score was received. The weighting is dynamic since the weights are constantly revised using ground truth data from the ongoing activities of the call handling system 104 and how well each of the classifiers predicted message and contact priority levels.

For example, while the contact assigned priority level gives the contact 102 an opportunity to honestly assign the priority level based on the contact's 102 perception of the contact's 102 own prioritization need, the combiner 128 preferably does not over weight the contact assigned priority level, because some contacts might improperly assign a higher priority level than appropriate in order to move their call or message up in either the on-hold queue 116 or the message mailbox 112. The weight assigned to the contact assigned priority level score is also preferably influenced by: the contact's 102 reputation for accurately assessing the priority level; whether the contact 102 has already spent a predetermined amount of time in dialog with the IVR module 110; and the business relevance categories 124 discussed above.

The data combiner 128 calculates a combined confidence score for the priority level attribute based on all the confidence scores received from the various classifiers. The combined confidence score can be calculated in several different ways depending upon how statistically independent the different classifiers 118, 120, 122, and 126 are.

One calculation method uses an equal-weighted product combination. The equal weighted method equally weights and multiplies together the confidence score from each of the classifiers 118, 120, 122, and 126 to yield the combined confidence score.

Another calculation method is the weighted linear summation, according to the following formula:

$$S = \sum_{j=1}^{N} r_j p_j$$

where N is a total number of classifiers, r is a weight assigned to classifier j, and Pj is a confidence score generated by Classifier j)

A third calculation method is the weighted exponential, according to the following formula:

$$S = \prod_{j=1}^{N} p_j^{r_j}$$

(where N is a total number of classifiers, r is a weight assigned to classifier j, and Pj is a confidence score generated by Classifier j)

A third calculation method uses a neural net, such as Multiple Layer Perception (MLP) network, with $\{p_1, p_2, \ldots, p_N\}$ as the input.

The combiner 128 stores the combined confidence score for the priority level attribute in the message attributes database 114.

The following table presents one example of how confidence scores from the different classifiers 118, 120, 122, and 126 can be weighted and combined to generate a single combined confidence score for the priority level attribute. In this example, the keyword classifier 120 and contact-assigned priority classifier 126 have been weighted half as much as the acoustic classifier 118 and the business relevance classifier 122.

| Contact Information | Acoustic Classifier (×1) | Business Relevance Classifier (×1) | Keyword Classifier (×0.5) | Contact-assigned Priority Classifier (×0.5) | Combined Score |
|---|---|---|---|---|---|
| Angry contact from important business | 0.9 | 0.8 | 0.1 | 0.1 | 1.8 |
| Angry contact from medium business | 0.9 | 0.5 | 0.1 | 0.1 | 1.5 |
| Contact from low importance business try to prioritize himself | 0.1 | 0.1 | 0.9 | 0.9 | 1.1 |
| Angry contact from important business prioritizing himself | 0.8 | 0.8 | 0.8 | 0.8 | 2.4 |

More sophisticated confidence score combination techniques can be used as well. For instance, the call handling system 104 could use historical data from the various classifiers to train a statistical classifier (for example, a neural network, SVM, linear regression, etc.), that would then be used to prioritize the contacts and messages based on runtime scores. Also, since some of the classifiers 118, 120, 122, and 126 may be computationally complex, such as the keyword classifier's 120 and business relevance classifier's 122 use of Automatic Speech Recognition, the present invention's efficiency is preferably increased by use of a hierarchical classifier strategy. One embodiment of such a hierarchical strategy includes: generating and combining priority level scores only until the combined priority level score exceeds a current highest combined priority level score for all of the other requests. Another embodiment of such a hierarchical strategy includes: identifying computational resources required to calculate each of the priority level scores; generating priority level scores for a new request hierarchically beginning with a priority level score requiring a least amount of computational resources; and stopping generation of the priority level scores once the combined priority level score for a new request exceeds a current highest combined priority level score.

For example, if the combined confidence scores from the acoustic classifier 118 and the contact-assigned priority classifier 126 already exceed all other combined confidence scores, then that contact or contact's message can be immediately placed first in either the on-hold queue 116 or message mailbox 112 obviating a need to engage the computationally costly keyword classifier 120 and business relevance classifier 122.

Sorting and Retrieving from the Message Mailbox and On-Hold Queue

The contact manager 108 sorts the messages in the message mailbox 112 and the contacts in the on-hold queue 116 based on their respective combined confidence scores stored in the message attributes database 114. Preferably, contact having a highest combined confidence score is first in the on-hold queue 116, and the message having a highest combined confidence score is first in the message mailbox 112.

Since the system 104 preferably operates in real-time, every time a new message is stored in the message mailbox 112, or a new contact is placed in the on-hold queue 116, the system 104 generates a new combined confidence score and the contact manager 108 resorts the messages in the message mailbox 112 and the contacts in the on-hold queue 116.

Next, the operator 106 requests a next message in the message mailbox 112 or connection to a next contact on-hold in the on-hold queue 116. The contact manager 108 sends the highest priority message in the message mailbox 112 to the operator 106, or connects the operator 106 to the highest priority contact in the on-hold queue 116.

Figure 2:
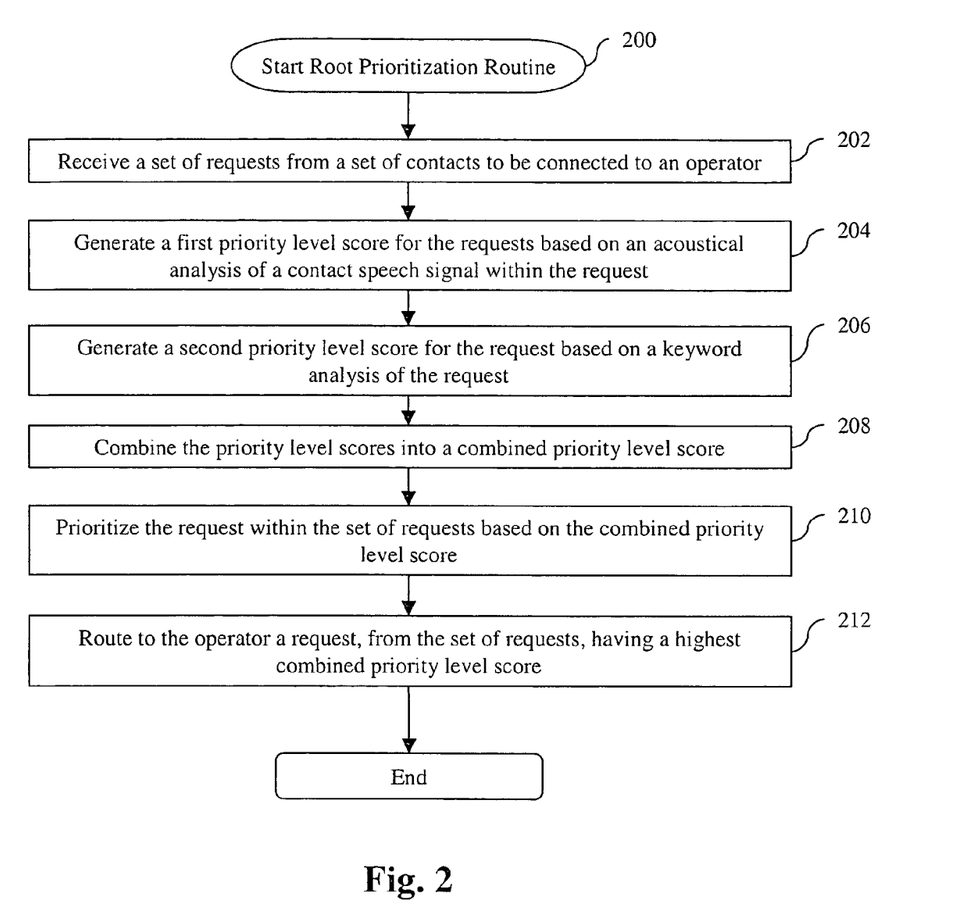
FIG. 2 is a flowchart of one embodiment of a root method for prioritizing contacts.

FIG. 2 is a flowchart of one embodiment of a root method 200 for prioritizing contacts. In step 202 a set of requests is received from a set of contacts to be connected to an operator. In step 204, a first priority level score is generated for the requests based on an acoustical analysis of a contact speech signal within the request. In step 206, a second priority level score is generated for the request based on a keyword analysis of the request. In step 208, the priority level scores are combined into a combined priority level score. In step 210, the request within the set of requests is prioritized based on the combined priority level score. In step 212, a request, from the set of requests, having a highest combined priority level score is routed to the operator. The root method 200 is discussed in further detail with respect to FIGS. 3A, B, and C.

Figure 3A:
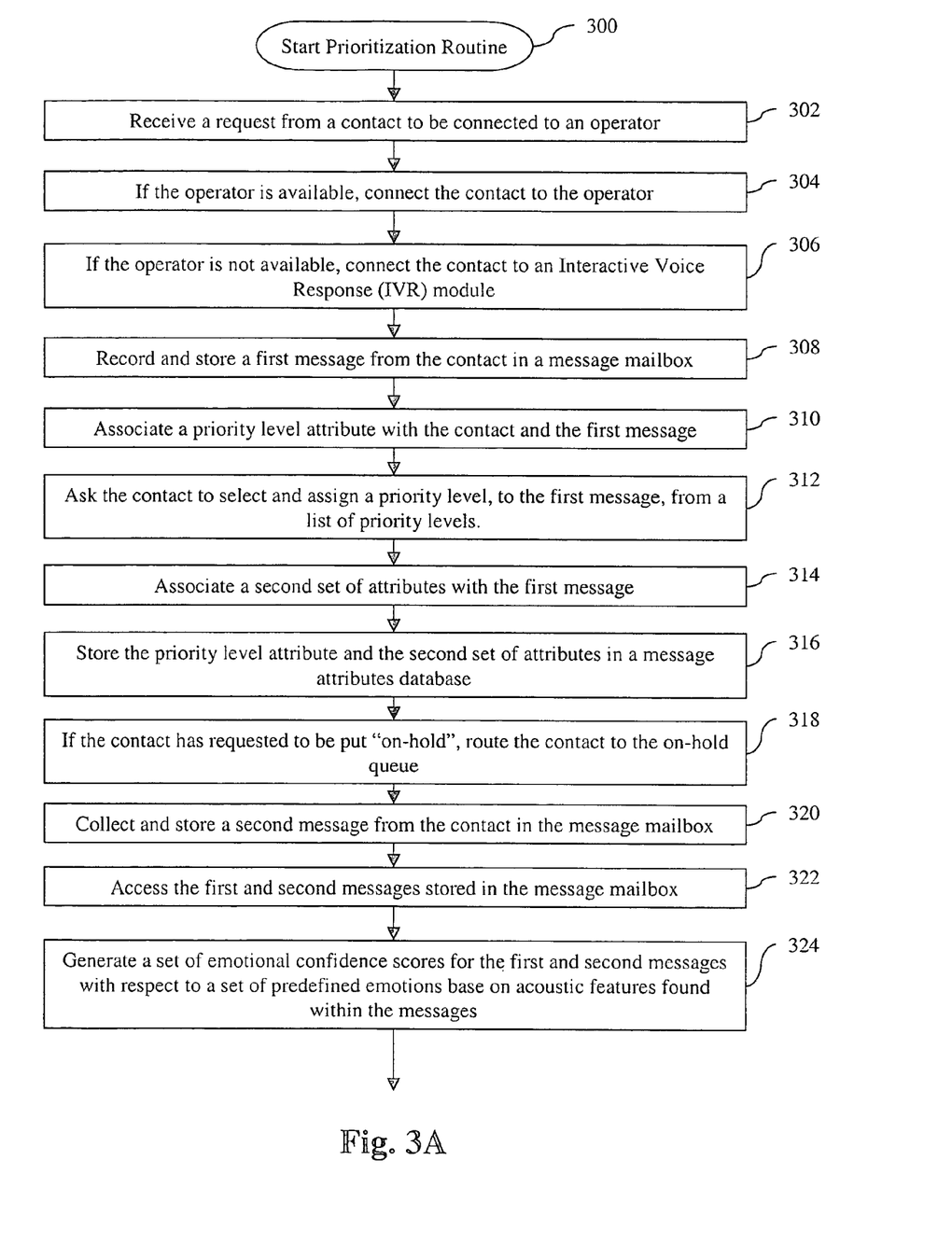
FIGS. 3A, B, and C are a flowchart of one expanded embodiment of the root method for prioritizing contacts.
Figure 3B:
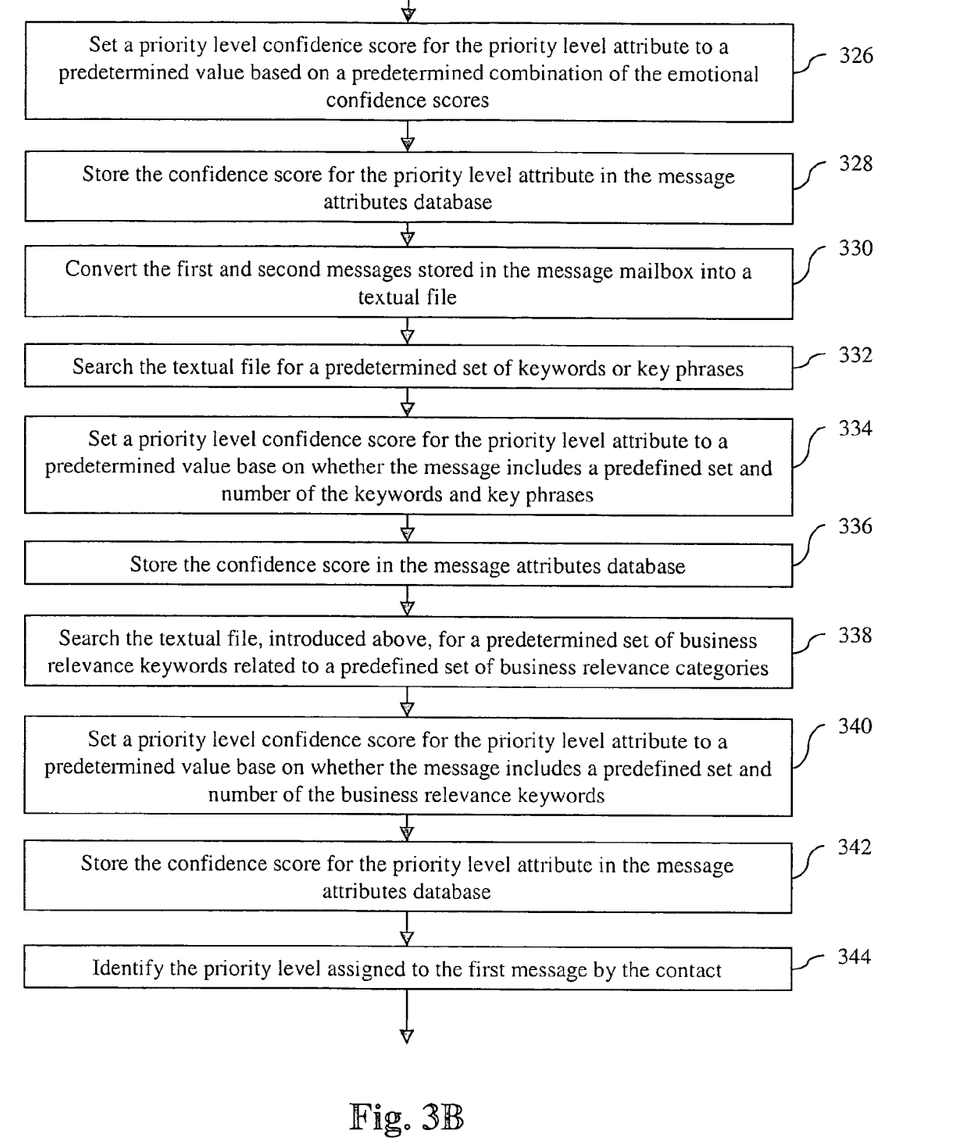
Figure 3C:
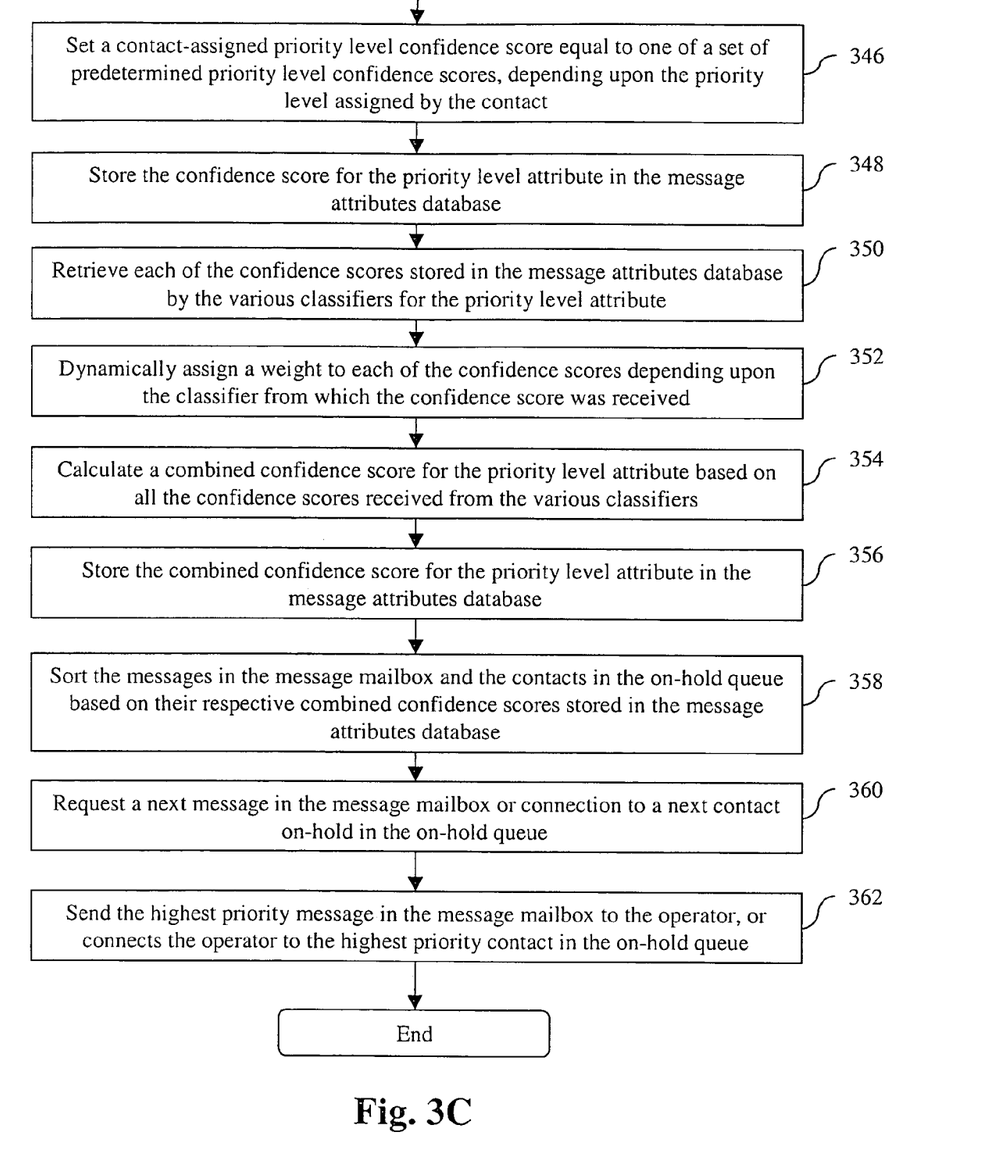

FIGS. 3A, B, and C are a flowchart of one expanded embodiment 300 of the root method for prioritizing contacts. To begin, in step 302, the call handling system 104 receives a request from a contact to be connected to an operator 106. In step 304, if the operator is available, a contact manager 108 connects the contact 102 to the operator 106. In step 306, if the operator is not available, the contact manager 108 connects the contact 102 to an Interactive Voice Response (IVR) module 110.

In step 308, the IVR module 110 records and stores a first message from the contact 102 in a message mailbox 112. In step 310, the IVR module associates a priority level attribute with the contact 102 and the first message. Next in step 312, the IVR module 110 asks the contact 102 to select and assign a priority level, to the first message, from a list of priority levels.

In step 314, the IVR module associates a second set of attributes with the first message. In step 316, the priority level attribute and the second set of attributes are stored in a message attributes database 114.

In step 318, if the contact 102 has requested to be put "on-hold", the IVR module 110 routes the contact 102 to the on-hold queue 116. In step 320, the IVR module 110 collects and stores a second message from the contact 102 in the message mailbox 112.

Acoustic Classifier

Next, in step 322, an acoustic classifier 118 accesses the first and second messages stored in the message mailbox 112. In step 324, the acoustic classifier 118 generates a set of emotional confidence scores for the first and second messages with respect to a set of predefined emotions base on acoustic features found within the messages. Next in step 326, the acoustic classifier 118 sets a priority level confidence score for the priority level attribute to a predetermined value based on a predetermined combination of the emotional confidence scores. In step 328, the acoustic classifier 118 stores the confidence score for the priority level attribute in the message attributes database 114.

Keyword Classifier

In step 330, the automated speech recognition (ASR) engine within the IVR module 110 converts the first and second messages stored in the message mailbox 112 into a textual file. In step 332, a keyword classifier 120 searches the textual file for a predetermined set of keywords or key phrases. In step 334, the keyword classifier 120 sets a priority level confidence score for the priority level attribute to a predetermined value base on whether the message includes a predefined set and number of the keywords and key phrases. In step 336, the keyword classifier 120 stores the confidence score in the message attributes database 114.

Business Relevance Classifier

In step 338, a business relevance classifier 122 searches the textual file, introduced above, for a predetermined set of business relevance keywords related to a predefined set of business relevance categories 124. In step 340, the business relevance classifier 122 sets a priority level confidence score for the priority level attribute to a predetermined value base on whether the message includes a predefined set and number of the business relevance keywords. In step 342, the business relevance classifier 122 stores the confidence score for the priority level attribute in the message attributes database 114.

Contact-Assigned Priority Classifier

In step 344, a contact-assigned priority level classifier 126 identifies the priority level assigned to the first message by the contact 102. In step 346, the contact-assigned priority level classifier 126 sets a contact-assigned priority level confidence score equal to one of a set of predetermined priority level confidence scores, depending upon the priority level assigned by the contact 102. Next in step 348, the priority level classifier 126 stores the confidence score for the priority level attribute in the message attributes database 114.

Data Combiner

In step 350, a data combiner 128 retrieves each of the confidence scores stored in the message attributes database 114 by the various classifiers 118, 120, 122, and 126 for the priority level attribute. In step 352, the combiner 128 dynamically assigns a weight to each of the confidence scores depending upon the classifier from which the confidence score was received. In step 354, the data combiner 128 calculates a combined confidence score for the priority level attribute based on all the confidence scores received from the various classifiers. In step 356, the combiner 128 stores the combined confidence score for the priority level attribute in the message attributes database 114.

Sorting and Retrieving from the Message Mailbox and On-Hold Queue

In step 358, the contact manager 108 sorts the messages in the message mailbox 112 and the contacts in the on-hold queue 116 based on their respective combined confidence scores stored in the message attributes database 114. Next in step 360, the operator 106 requests a next message in the message mailbox 112 or connection to a next contact on-hold in the on-hold queue 116. In step 362, the contact manager 108 sends the highest priority message in the message mailbox 112 to the operator 106, or connects the operator 106 to the highest priority contact in the on-hold queue 116.

While one or more embodiments of the present invention have been described, those skilled in the art will recognize that various modifications may be made. Variations upon and modifications to these embodiments are provided by the present invention, which is limited only by the following claims.

What is claimed is:

1. A method for prioritizing, comprising:
   receiving a set of requests from a set of contacts to be connected to a recipient;
   generating a first priority level score for each request based on an acoustical analysis of a contact speech signal within the request;
   generating a second priority level score for each request based on a keyword analysis of the request;
   combining the priority level scores for each request into a combined priority level score;
   prioritizing the requests within the set of requests based on their respective combined priority level scores; and
   routing to the recipient that request, from the set of requests, having a highest combined priority level score.

2. The method of claim 1, wherein the recipient is an operator.

3. The method of claim 1, wherein receiving includes:
   recording a message from a contact.

4. The method of claim 3, wherein recording includes:
   recording speech signals from the contact while the contact is on-hold.

5. The method of claim 1, wherein:
the requests are messages; and
routing includes sending the operator a message having a highest combined priority level score.

6. The method of claim 5, wherein:
the message is an e-mail message.

7. The method of claim 1, wherein:
the requests are in a form of a set of contacts waiting on-hold; and
routing includes connecting the operator to an on-hold contact having a highest combined priority level score.

8. The method of claim 1, wherein generating the first score includes:
identifying acoustic features within the speech signal corresponding to a set of predefined emotions;
setting the first score to a higher value if the acoustic features correspond to a first sub-set of the predefined emotions; and
setting the first score to a lower value if the acoustic features correspond to a second sub-set of the predefined emotions.

9. The method of claim 8, wherein:
the predefined emotions include anger and frustration.

10. The method of claim 1, wherein generating the second score includes:
searching the request for a set of predefined keywords;
setting the second score to a higher value if the request includes a predefined number of a first predetermined subset of the keywords; and
setting the second score to a lower value if the request includes a predefined number of a second predetermined subset of the keywords.

11. The method of claim 10, wherein:
the predefined keywords include "urgent".

12. The method of claim 1, wherein generating the second score includes:
searching the request for a set of predefined business relevance keywords;
setting the second score to a higher value if the request includes a predefined number of a first predetermined subset of the business relevance keywords; and
setting the second score to a lower value if the request includes a predefined number of a second predetermined subset of the business relevance keywords.

13. The method of claim 12, wherein:
the predefined business relevance keywords include: a service contract.

14. The method of claim 1, further comprising:
generating a third priority level score for the request based on a contact-assigned priority level for the request.

15. The method of claim 14, wherein generating the third score includes:
searching the request for a contact-assigned priority level selected from a set of predefined priority levels; and
setting the third score equal to one of a set of predetermined priority level scores based upon the contact-assigned priority level.

16. The method of claim 15, wherein:
the predefined priority levels include: "high" and "low".

17. The method of claim 1, wherein combining includes:
weighting the confidence scores using ground truth data.

18. The method of claim 1, wherein;
the scores are statistical confidence scores; and
combining includes, multiplying together the priority level confidence scores.

19. The method of claim 1, wherein:
the scores are statistical confidence scores; and
combining includes, combining the priority level confidence scores according to the following formula:

$$S = \sum_{j=1}^{N} r_j p_j$$

(where N is a total number of classifiers, r is a weight assigned to classifier j, and Pj is a confidence score generated by Classifier j).

20. The method of claim 1, wherein:
the scores are statistical confidence scores; and
combining includes, combining the confidence scores from each classifier for each demographic characteristic according to the following formula:

$$S = \prod_{j=1}^{N} p_j^{r_j}$$

(where N is a total number of classifiers, r is a weight assigned to classifier j, and Pj is a confidence score generated by Classifier j).

21. The method of claim 1, further comprising:
skipping the generating the second priority level score and the combining the priority level scores, for a new request, if the first priority level score for the new request is already greater than a current highest combined priority level score; and
setting the combined priority level score for the new request equal to the first priority level score.

22. The method of claim 1, further comprising:
identifying computational resources required to calculate each of the priority level scores;
generating priority level scores for a new request hierarchically beginning with a priority level score requiring a least amount of computational resources; and
stopping generation of the priority level scores once the combined priority level score for a new request exceeds a current highest combined priority level score.

23. The method of claim 1, wherein combining includes:
using a neural net to combine the priority level scores.

24. The method of claim 1, wherein receiving includes:
receiving a set of requests from a set of customers to be connected to an operator at a call center.

25. A method for prioritizing, comprising:
receiving a set of requests from a set of contacts to be connected to an operator;
generating a first priority level score for each request based on an acoustical analysis of a contact speech signal within each request;
identifying acoustic features within the speech signal corresponding to a set of predefined emotions;
setting the first score for a request to a higher value if the acoustic features correspond to a first sub-set of the predefined emotions;
setting the first score for the request to a lower value if the acoustic features correspond to a second sub-set of the predefined emotions;
generating a second priority level score for each request based on a keyword analysis of each request;
searching each request for a set of predefined keywords;

setting the second score for the request to a higher value if the request includes a predefined number of a first predetermined subset of the keywords;

setting the second score for the request to a lower value if the request includes a predefined number of a second predetermined subset of the keywords;

generating a third priority level score for each request based on a contact-assigned priority level to the request;

searching each request for a contact-assigned priority level selected from a set of predefined priority levels;

setting the third score for the request equal to one of a set of predetermined priority level scores based upon the contact-assigned priority level;

combining the priority level scores for each request into a combined priority level score;

prioritizing the requests within the set of requests based on their respective combined priority level scores; and routing to the operator that request, from the set of requests, having a highest combined priority level score.

26. A computer-usable medium embodying computer program code for commanding a computer to prioritize, comprising:

receiving a set of requests from a set of contacts to be connected to a recipient;

generating a first priority level score for each request based on an acoustical analysis of a contact speech signal within the request;

generating a second priority level score for each request based on a keyword analysis of the request;

combining the priority level scores for each request into a combined priority level score;

prioritizing the requests within the set of requests based on their respective combined priority level scores; and routing to the recipient that request, from the set of requests, having a highest combined priority level score.

27. A system for prioritizing, comprising a:

means for receiving a set of requests from a set of contacts to be connected to a recipient;

means for generating a first priority level score for each request based on an acoustical analysis of a contact speech signal within the request;

means for generating a second priority level score for each request based on a keyword analysis of the request;

means for combining the priority level scores for each request into a combined priority level score;

means for prioritizing the requests within the set of requests based on their respective combined priority level scores; and means for routing to the recipient that request, from the set of requests, having a highest combined priority level score.

* * * * *